United States Patent
Li et al.

(10) Patent No.: US 8,099,731 B2
(45) Date of Patent: Jan. 17, 2012

(54) SYSTEM HAVING MINIMUM LATENCY USING TIMED MAILBOX TO ISSUE SIGNAL IN ADVANCE TO NOTIFY PROCESSOR OF THE AVAILABILITY OF THE SHARED RESOURCES

(75) Inventors: Cheng-Wei Li, Chu-Pei (TW); Chung-Chou Shen, Hsin-Tien (TW)

(73) Assignee: Industrial Technology Research Institute, Hsinchu (TW)

( * ) Notice: Subject to any disclaimer, the term of this patent is extended or adjusted under 35 U.S.C. 154(b) by 1400 days.

(21) Appl. No.: 11/624,227

(22) Filed: Jan. 18, 2007

(65) Prior Publication Data

US 2008/0104604 A1    May 1, 2008

(30) Foreign Application Priority Data

Oct. 27, 2006  (TW) .............................. 95139856 A

(51) Int. Cl.
*G06F 9/46* (2006.01)
*G06F 13/00* (2006.01)
*G06F 1/04* (2006.01)
*G06F 12/00* (2006.01)
*G06F 13/28* (2006.01)

(52) U.S. Cl. ........ 718/104; 718/108; 711/150; 711/151; 711/152; 713/375; 713/502; 710/23; 710/110; 710/241

(58) Field of Classification Search ........................ None
See application file for complete search history.

(56) References Cited

U.S. PATENT DOCUMENTS

| | | | | |
|---|---|---|---|---|
| 5,764,931 A | * | 6/1998 | Schmahl et al. | 713/600 |
| 5,943,391 A | | 8/1999 | Nordling | 379/1 |
| 6,009,389 A | | 12/1999 | Dokic et al. | 704/228 |
| 6,012,142 A | | 1/2000 | Dokic et al. | 713/2 |
| 6,081,783 A | | 6/2000 | Divine et al. | 704/500 |
| 6,145,007 A | | 11/2000 | Dokic et al. | 709/230 |
| 6,253,293 B1 | | 6/2001 | Rao et al. | 711/147 |
| 6,349,285 B1 | | 2/2002 | Liu et al. | 704/500 |
| 6,356,871 B1 | | 3/2002 | Hemkumar et al. | 704/500 |
| 6,385,704 B1 | | 5/2002 | Rao et al. | 711/151 |
| 6,665,409 B1 | | 12/2003 | Rao | 381/63 |
| 6,782,300 B2 | | 8/2004 | Pillay et al. | 700/94 |
| 6,804,655 B2 | | 10/2004 | Dokic et al. | 704/500 |
| 6,898,470 B1 | | 5/2005 | Rao et al. | 700/94 |
| 6,937,988 B1 | | 8/2005 | Hemkumar et al. | 704/500 |
| 6,938,253 B2 | | 8/2005 | Kim | 718/102 |
| 7,000,138 B1 | | 2/2006 | Pillay et al. | 713/600 |
| 2003/0033490 A1 | * | 2/2003 | Gappisch et al. | 711/150 |
| 2004/0046611 A1 | * | 3/2004 | Uneme | 331/17 |

* cited by examiner

*Primary Examiner* — Meng An
*Assistant Examiner* — Abullah Al Kawsar

(57) ABSTRACT

The present invention provides an apparatus and method that increases the utilization by processors on shared resources. It provides the minimum latency in a multiprocessor system during usage right exchange between multi-processors on a shared resource. The apparatus provides a timed mailbox including a timer. The timed mailbox is at least associated with a first processor and a second processor. The second processor starts to utilize a shared resource to perform a task. According to a predetermined clock cycle number, the timed mailbox issues a signal in advance to notify the first processor of the availability of the shared resource to be utilized by the first processor.

17 Claims, 5 Drawing Sheets

SYSTEM HAVING MINIMUM LATENCY USING TIMED MAILBOX TO ISSUE SIGNAL IN ADVANCE TO NOTIFY PROCESSOR OF THE AVAILABILITY OF THE SHARED RESOURCES

FIELD OF THE INVENTION

The present invention generally relates to an apparatus and method for increasing the shared resource utilization by processors, applicable to a multiprocessor platform where processors having minimum latency when exchanging the usage of shared resources.

BACKGROUND OF THE INVENTION

When a computer system must process the special purpose for application software, the computer usually employs an additional processor, such as a digital signal processor (DSP), or a floating-point unit (FPU). For embedded multimedia applications, such as mobile phones, the micro-processing unit (MPU) is used due to the power consumption and heat dissipation consideration, and thus the mathematical computing capability is compromised. To provide multimedia applications, a DSP is usually included to handle the multimedia compression or decompression. For example, a dual-core system-on-a-chip (SoC) with a MPU and a DSP, such as DM series of TI, and the parallel architecture core (PAC) SoC by SoC Technology Center (STC) of ITRI are examples of such development.

When an MPU and a DSP are on the same platform and working together, the platform can be considered as a multiprocessor platform. The multiprocessor platform usually faces the synchronization problem of shared resources; therefore, a mechanism must be provided so that only a processor is using the shared resource at any time. The conventional technique is to use a semaphore mechanism in the shared memory to lock the shared resource. The conventional semaphore suffers from the efficiency problem. In addition, to prevent the error caused by multiple processors accessing the semaphore, the processors will lock the bus, which further reduces the utilization and efficiency. Another problem is the lack of an efficient mechanism to notify the waiting processor when a shared resource becomes available.

Another conventional technique is a mailbox mechanism in hardware. The mailbox mechanism issues an interrupt to the specific processor after writing to command and data register. Then, the interrupt service routine (ISR) wakes up a specific application software to use the shared resource. The dsp gateway of Nokia uses such a mechanism, and an inter-process communication (IPC) framework is developed on the OMAP5912 platform so that the MPU processing schedule and the tasks on DSP can communicate with each other through a simple application programming interface (API).

FIG. 1 shows a flowchart of data reading and writing on an IPC framework of a mailbox mechanism of a conventional multi-processor system. As shown in FIG. 1, a dual-core processor platform includes an MPU and a DSP. When the application software on MPU issues a command to request DSP to process data (shown as 101), the operating system of MPU and the IPC framework will assign the shared resource to DSP (shown as 102). The MPU_to_DSP mailbox receives the data transmission request 103 from MPU, and issues an interrupt command 104 to DSP. DSP interrupt service routine receives the interrupt command (shown as 105), and DSP executes the data processing request of MPU (shown as 106). Time T1 is the time when DSP finishes the data processing.

When DSP finishes data processing, the shared resource is assigned to MPU (shown as 107). The setting of shared resource by DSP to MPU will wake up the application software on MPU, described as follows.

DSP_to_MPU mailbox receives the data transmission request 108 from DSP, and issues an interrupt command 109 to MPU. MPU interrupt service routine receives interrupt command 109 (shown as 110). Then, IPC framework wakes up the application software (shown as 111), and the application software on MPU starts to use the shared resource and process data (shown as 112). Time T2 is the time when IPC framework on MPU end wakes up the application software to start using the shared resource.

A data latency problem leading to performance efficiency can be observed in FIG. 1. Theoretically, the ideal situation should be that time T1 when DSP finishing processing data equals to time T2 when IPC framework on MPU waking up application software to use shared resource. Thus, no data latency is observed. However, in an actual application, the following factors may contribute to the difference between T1 and T2:

1. the time for DSP to write to the register of DSP_to_MPU mailbox;
2. the time from finishing writing to DSP_to_MPU mailbox register to DSP_to_MPU mailbox issuing the interrupt command;
3. the time from DSP_to_MPU issuing the interrupt command to MPU receiving the interrupt command;
4. the time from MPU receiving the interrupt command to ISR of MPU operating system starting to execute;
5. the time for ISR of MPU operating system to execute and IPC framework execution time; and
6. the time from IPC framework waking up the application software to the application software starting to use the shared resource.

Items 1-3 of the above list are the simple register writing and hardware operation, and may require tens of clock cycles to finish. With a 100 system bus, the 10 clock cycles will take 0.1 us. Item 4 is defined as interrupt latency, and item 5 is the necessary execution process for operating system and IPC framework.

The duration of item 6 depends on the operating system scheduling. The experiment with Linux2.6 Operating System shows that after the ISR finishes, a scheduling algorithm evaluates whether to schedule the CPU to another task. In addition, when the application software requests to IPC framework for shared resource while DSP has not yet finished processing data, the application software is requested to hand over the CPU. When IPC framework informs the application software to use the shared resource, the application software must wait until the CPU is available to the application software. Items 4-6 of the above list are defined as task latency. The task latency depends on the system workload, and the time record can be used to estimate the task latency.

U.S. Pat. No. 6,938,253 disclosed a system and method for multiprocessor communication, including the integration of semaphore and mailbox mechanism so that when the resource is not required to be locked, the mailbox mechanism can be used to inform the specific processor and application software to use the shared resource. This patent emphasizes the elimination of the need to lock the resource to improve the semaphore efficiency in a multiprocessor environment. However, when the system is busy, the task latency problem remains for the mailbox mechanism.

Cirrus Logic, Inc. proposed an IPC framework implemented with mailbox mechanism. But the technique does not address the performance improvement issue of IPC.

SUMMARY OF THE INVENTION

The present invention has been made to overcome the above-mentioned drawback of conventional shared resource mechanism used in a multiprocessor environment. The primary object of the present invention is to provide an apparatus and method for improving the utilization by the processor on the shared resource. The present invention provides a method for the processors of a multiprocessor platform to experience the minimum latency during shared resource exchange.

The multiprocessor platform has at least one shared resource. The apparatus for improving the utilization by the processors on the shared resource of the present invention includes a timed mailbox, connected to at least a first processor and a second processor. The second processor is currently using a shared resource in the platform. The timed mailbox uses a timer with a pre-determined period to issue a warning signal in advance to inform the first processor to use the shared resource.

Based on the present invention, the multiprocessor platform does not need to modify the operating system core. The pre-determined period can be determined by the statistic estimation of the latency so that the apparatus can wake up the first processor in advance before the second processor finishes using the shared resource to avoid the task latency and improve the utilization.

A dual-core platform is used as a working example to describe the present invention. The dual-core platform includes an MPU and a DSP. Through the timer of the timed mailbox, an interrupt command is issued in advance at a pre-determined period to the MPU to prepare for using shared resource. Therefore, when the DSP finishes processing data and releases the shared resource to the MPU, the MPU can immediately start using the shared resource, and the latency of the shared resource exchange is reduced.

In other words, the present invention reduces the waiting time of the shared resource, and improves the utilization of the shared resource. In addition, the timed mailbox can replace the hardware mailbox in the conventional technique. Compared to the conventional technique, the present invention does not need extra hardware cost.

Based on the present invention, the pre-determined period of the timer can be set by the first processor or the second processor. The task latency of the system $T_L$ can be estimated in advance. The data processing time $T_d$ of the second processor can also be estimated in advance. The pre-determined period can be set to $T_L-T_d$, and the timed mailbox can use the timer to control the issuing of the interrupt command. The time between the timed mailbox issuing an interrupt command to the first processor and the first processor waking up the application software to prepare for using the shared resource is approximately equal to the data processing time of the second processor.

The foregoing and other objects, features, aspects and advantages of the present invention will become better understood from a careful reading of a detailed description provided herein below with appropriate reference to the accompanying drawings.

DETAILED DESCRIPTION OF THE PREFERRED EMBODIMENTS

Figure 1:
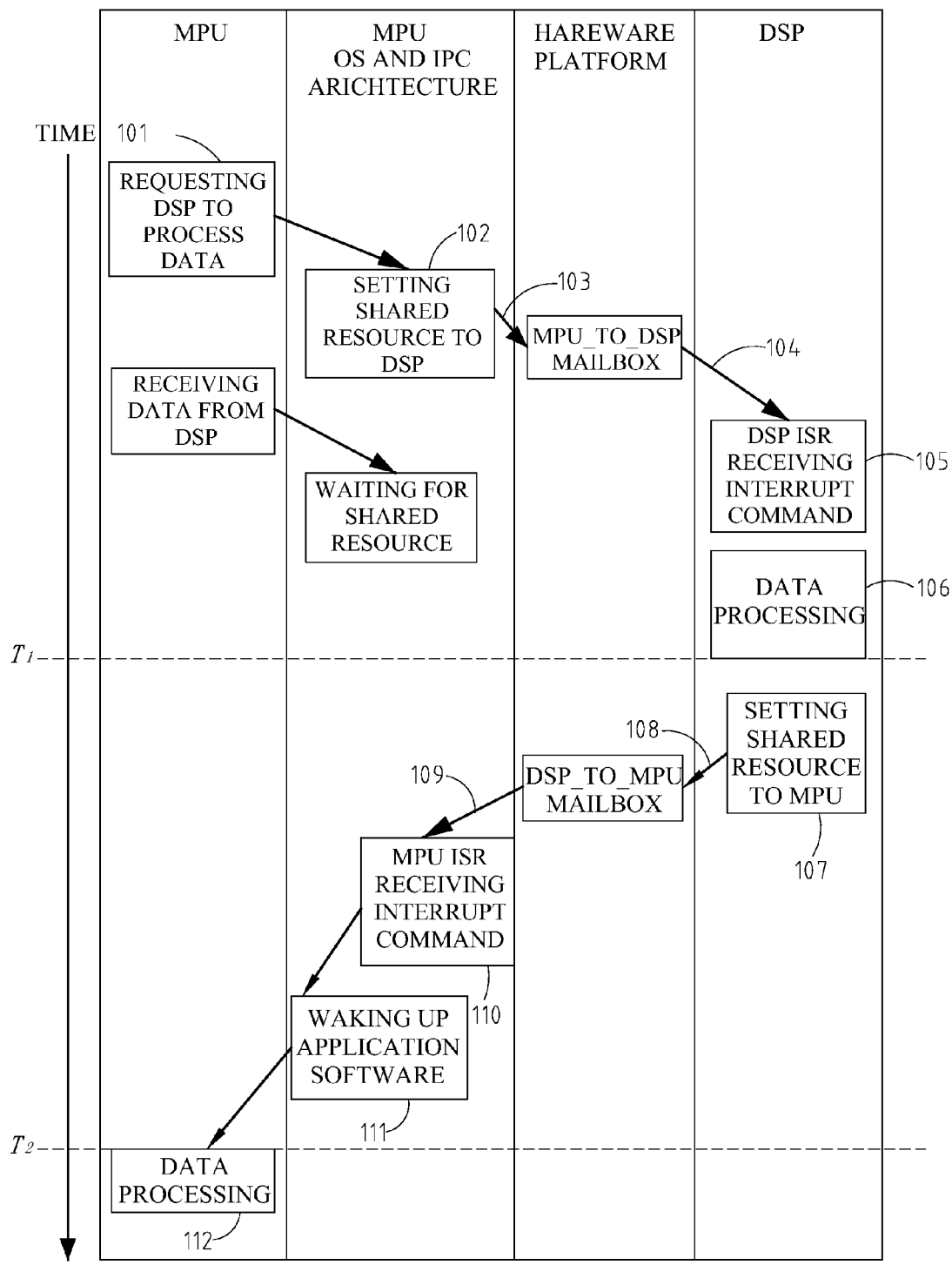
FIG. 1 shows a flowchart of data reading and writing on an IPC framework of a mailbox mechanism of a conventional multi-processor system.
Figure 2:
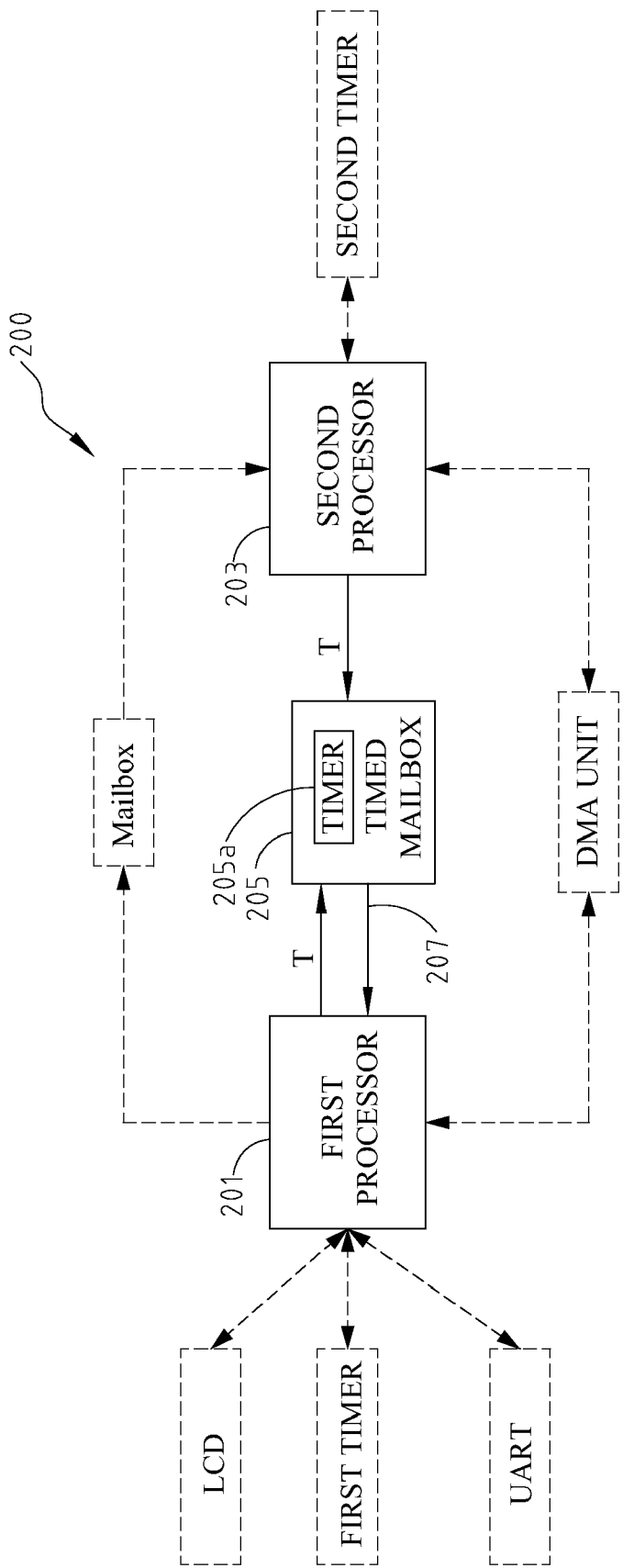
FIG. 2 shows a schematic view of an apparatus for improving utilization by the processors on the shared resources according to the present invention.

FIG. 2 shows a schematic view of an apparatus for improving utilization by the processors on the shared resources according to the present invention. The apparatus is applicable to a multiprocessor platform with at least one shared resource. As shown in FIG. 2, a multiprocessor platform 200 includes at least a first processor 201 and a second processor 203. Second processor 203 starts using a shared resource of multiprocessor platform 200 for a data processing task. The apparatus for improving utilization by the processor on the shared resources includes a timed mailbox 205. Timed mailbox 205 further includes a timer 205a, and is connected to a first processor 201 and a second processor 203 respectively. Timer 205a issues a signal 207 at a pre-determined period T in advance to the first processor 201 to prepare for using the shared resource.

In multiprocessor platform 200, the first processor 201 and the second processor 203 can be connected to a plurality of peripheral devices; for example, the first processor 201 is connected to an LCD unit, a first timer, a UART unit, a DMA unit and a mailbox unit, while the second processor 203 is connected to a DMA unit, a second timer, and for receiving the signals from the mailbox.

As described earlier, the latency affecting system utilization includes the time from the first processor receiving the interrupt command to ISR executing, the time for IPC framework execution, and the time to wake up the application software to use the shared resource, collectively called task latency. The task latency can be estimated statistically. Therefore, the pre-determined period T can be estimated, and the first processor or the second processor can set timer 205a accordingly.

The timed mailbox 205 includes a timer in a conventional mailbox mechanism. The timed mailbox 205, based on T of timer 205a, issues a warning signal, such as an interrupt command, in advance to the first processor 201 to prepare for using the shared resources. Compared to the conventional technique configuring a plurality of hardware mailboxes in the multiprocessor platform, the timed mailbox 205 of the present invention does not require any additional hardware. In addition, the timed mailbox 205 issues the interrupt command at the same time when the second processor 203 is processing data to avoid the utilization reduction caused by latency.

Figure 3:
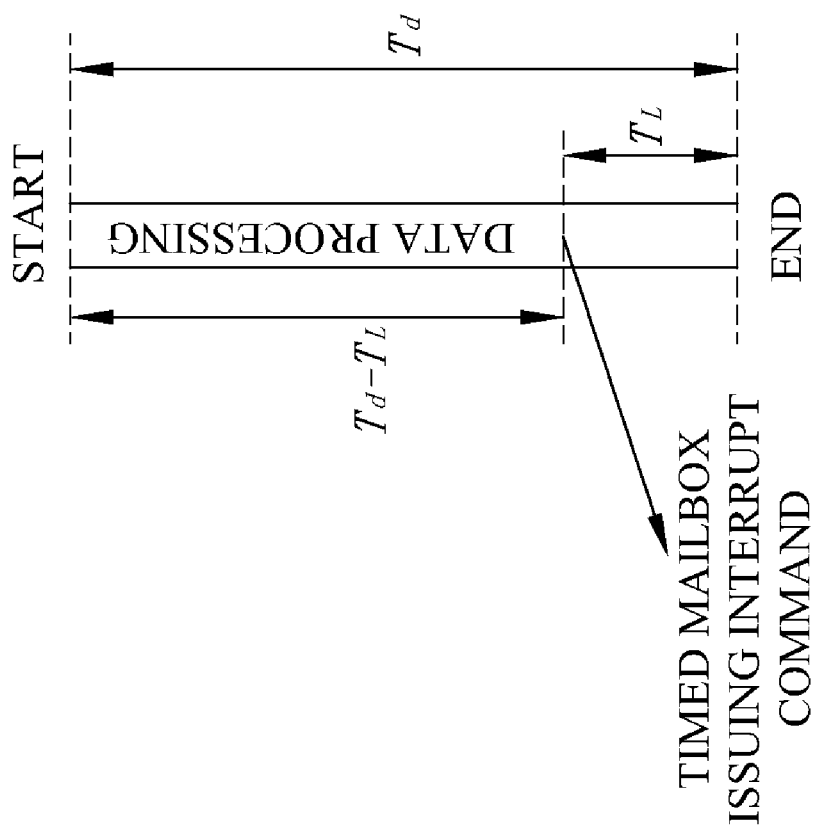
FIG. 3 shows a schematic view of the time for describing a warning signal issued during the second processor processing the data.

The data processing time of the second processor 203 can also be estimated in advance; for example, the cycles of mp3, H.264 algorithms. FIG. 3 shows a schematic view of the time to describe a warning signal is issued during the second processor processing the data. As shown in FIG. 3, the second processor requires $T_d$ cycles to finish processing data, and system estimated task latency is $T_L$ cycles. Therefore, the timer in the timed mailbox is set to be $T_d-T_L$. In other words, the timed mailbox 205 issues an interrupt signal in $T_d-T_L$ cycles in advance.

Figure 4:
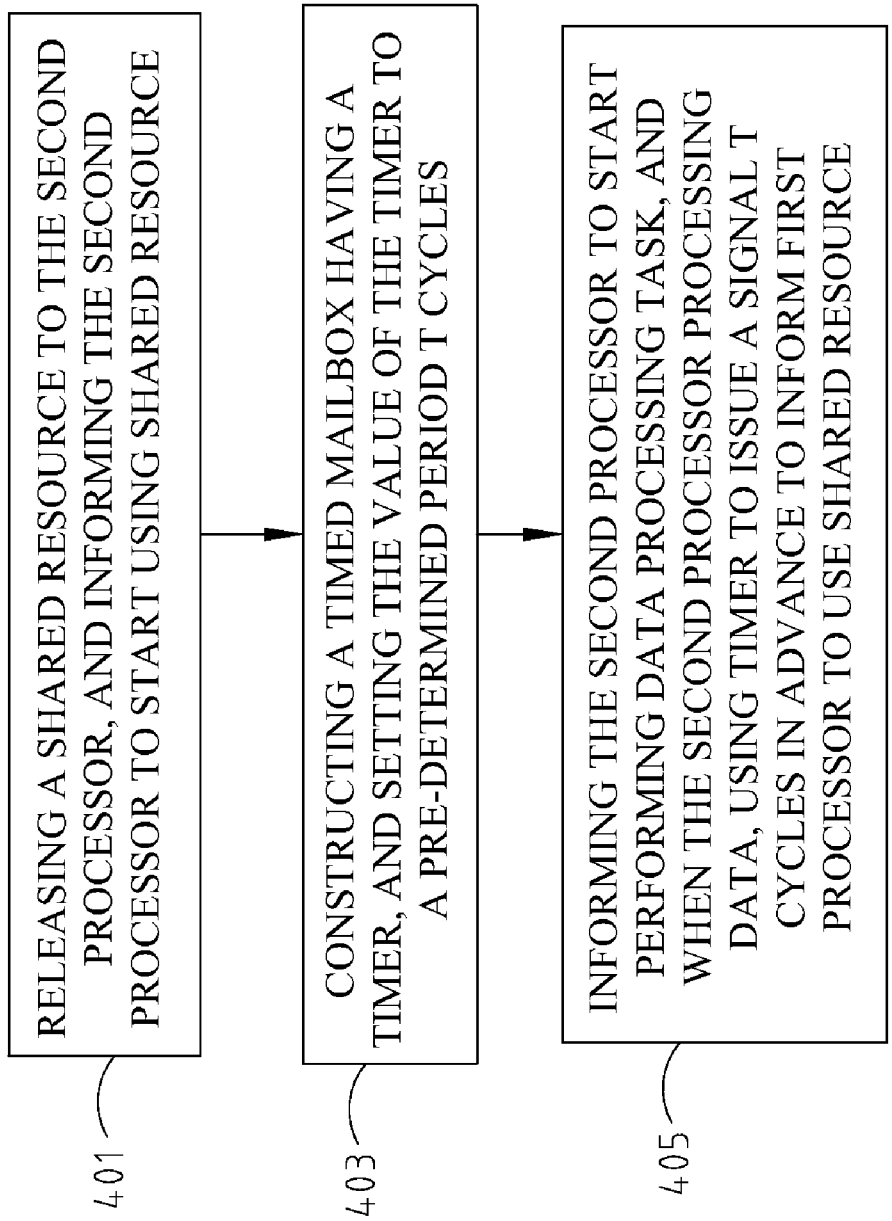
FIG. 4 shows a flowchart of the processors sharing a resource on multiprocessor platform with timed mailbox according to the present invention.

FIG. 4 shows a flowchart of the processors sharing a resource on multiprocessor platform 200 with timed mailbox 205. As shown in step 401, when the first processor 201 requests the second processor 203 to execute a data processing task, the first processor 201 releases a shared resource to the second processor 203 and informs the second processor 203 to start using the shared resource.

Step 403 is to set the value of the timer of timed mailbox 205 to T. The value T equals $T_d-T_L$ cycles. Step 405 is to inform the second processor 203 to start processing data, and when the T cycles of the timer count down to zero, a warning signal is issued to the first processor 201 to use the shared resource.

It is worth noticing that there exist two mechanisms to set the timer to T. The first mechanism is for the first processor to set the timer, and the second mechanism is for the second processor to set the timer. Using the MPU with DSP platform as an example, for many applications with DSP as the co-processor, the MPU can estimate the processing time required by the DSP, such as mp3 or H.264 decoding. Therefore, the MPU is preferred to perform the timer setting.

On the other hand, when the MPU cannot predict the processing time required by the DSP, such as the ISR of DSP usually depending on the information from the mailbox, only the DSP can estimate the processing time $T_d$; hence DSP is preferred to perform the timer setting.

In step 430, because the first processor 201 can estimate the task latency $T_L$, the first processor 201 can set the timer to $T_d-T_L$ if the first processor 201 can also estimate the data processing time $T_d$ requires by the second processor 203. Otherwise, the second processor 203 can set the timer to $T_d-T_L$.

After the first processor 201 receives the interrupt command from the timed mailbox 205, the ISR of the first processor 201 starts to execute, wakes up the application software of the first processor 201, and checks whether the second processor 203 has released the shared resource. Therefore, the task latency for the first processor 201 to receive the interrupt command and wake up the application is $T_L$ cycles. The data processing time for the second processor 203 is $T_d$. Hence, the time for the second processor 203 to release the shared resource is almost simultaneous with the time for the first processor 201 to start using the shared resource, which leads to the improvement of utilization by reducing the waiting.

Figure 5:
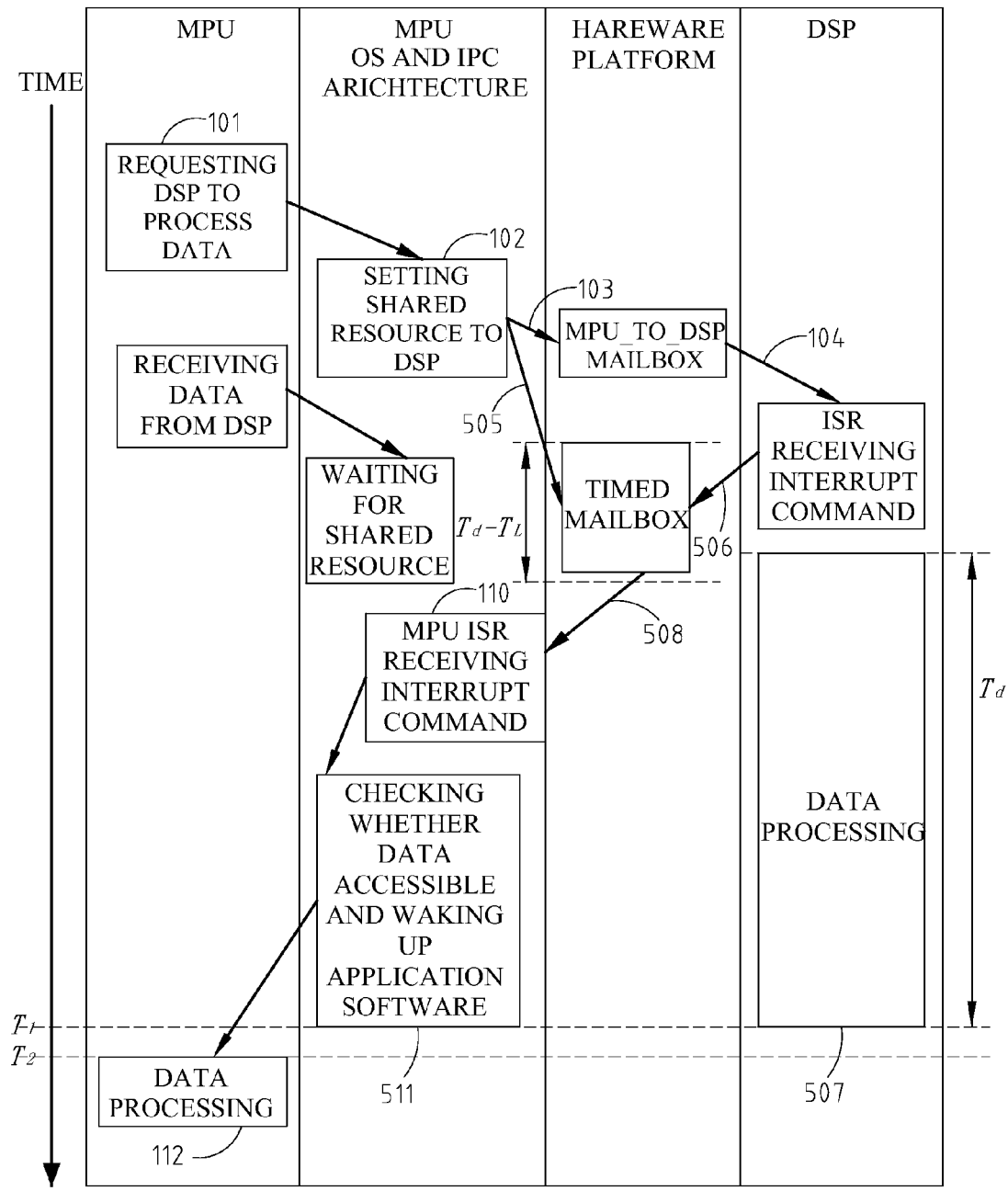
FIG. 5 shows a schematic view of the process of the present invention applied to a dual-core platform having an MPU and a DSP.

FIG. 5 shows a schematic view of the process of the present invention applied to a dual-core platform having an MPU and a DSP. As shown in FIG. 5, when the application software on the MPU requests the DSP to perform a data processing task (shown as 101), the operating system of the MPU releases the shared resource to the DSP (shown as 102), and the MPU_to_DSP mailbox receives the data transmission request from the MPU (shown as 103). Then, the MPU_to_DSP mailbox issues an interrupt command to the DSP (shown as 104), and the MPU determines whether the data processing task of the DSP can be estimated.

If the processing time $T_d$ of the DSP can be estimated by the MPU, and the MPU estimates the task latency is $T_L$, the MPU can set the value of the timer to $T_d-T_L$ (shown as 505).

Otherwise, the ISR of the DSP receives the interrupt command from the MPU_to_DSP mailbox, estimates the DSP's data processing time of $T_d$ clock cycles according to the estimated MPU's task latency of $T_L$ clock cycles, and the DSP can set the value of the timer to $T_d-T_L$ (shown as 506).

Then, the DSP uses the shared resource to process data (shown as 507), and the mailbox timer starts to count down. When the timer counts down to zero, i.e., after $T_d-T_L$ cycles, the timed mailbox issues an interrupt command to the MPU (shown as 508) to prepare for using the shared resource.

After the ISR of the MPU receives the interrupt command 508, the Operating System of the MPU checks whether the data is accessible and application software should be awaken (shown as 511). In the meantime, the DSP finishes processing data at time $T_1$. When the DSP finishes data processing, the ISR of the DSP releases the shared resource to the MPU, and sets the shared resource to be available.

Because the Operating System of the MPU checks whether the data is accessible and application software should be awaken at time $T_2$, and the MPU detects that the DSP has released the shared resource, the application software on the MPU can use the shared resource to process data. Under the circumstance that the workload of the system has a little difference, the time when the DSP finishes data processing is close to the time when the MPU starts to use the shared resource, thereby reducing the latency.

The present invention can use a checking mechanism, such as a flag register, to verify that the shared resource is released before waking up the application software. When the workload of the system has a larger difference, the MPU may find out through the flag register that the DSP has not yet released the shared resource. This situation can be solved by repeatedly checking the flag register until the flag register indicates that the DSP has released the shared resource.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An apparatus for improving utilization of shared resources in a multiprocessor platform, comprising:
    a shared resource;
    a first processor waiting to use said shared resource;
    a second processor starting to use said shared resource for performing a data processing task upon request from said first processor; and
    a timed mailbox having a timer, said timed mailbox being hardware based and said timer being set with a pre-determined period of time which is a difference between system task latency $T_L$ and data processing time $T_d$ of said second processor;
    wherein when said pre-determined period of time after said second processor starts performing said data processing task is reached, said timer issues a signal to said first processor for said first processor to prepare for using said shared resource.

2. The apparatus as claimed in claim 1, wherein said pre-determined period of time is set by said second processor.

3. The apparatus as claimed in claim 1, further including a checking mechanism to check whether said shared resource has been released.

4. The apparatus as claimed in claim 3, wherein said checking mechanism is a flag register.

5. The apparatus as claimed in claim 1, wherein said signal is an interrupt command.

6. The apparatus as claimed in claim 1, wherein said first processor is a micro-processing unit.

7. The apparatus as claimed in claim 1, wherein said second processor is a digital signal processor.

8. The apparatus as claimed in claim 1, wherein said pre-determined period of time is set by said first processor.

9. A method for improving utilization of shared resources in a multiprocessor platform, said method comprising the following steps of:
  using a first processor to request a second processor for performing a data processing task with said first processor waiting to use a shared resource;
  releasing said shared resource to said second processor, and informing said second processor to start using said shared resource;
  constructing a timed mailbox having a timer, and setting said timer with a pre-determined period of T cycles;
  informing said second processor to start performing said data processing task; and
  using said timer to issue a signal to said first processor for said first processor to prepare for using said shared resource when said pre-determined period of T cycles after said second processor starts performing said data processing task is reached;
  wherein said pre-determined period of T cycles of said timer is a difference between system task latency $T_L$ and data processing time $T_d$ of said second processor.

10. The method as claimed in claim 9, wherein said pre-determined period of T cycles of said timer is set by software on said second processor.

11. The method as claimed in claim 9, wherein said pre-determined period of T cycles of said timer is estimated in advance or statistically recorded.

12. The method as claimed in claim 9, further including a step of verifying said shared resource being released before said first processor receives the issued signal.

13. The method as claimed in claim 12, wherein said step of verifying said shared resource being released uses a checking mechanism having a flag to mark release status.

14. The method as claimed in claim 13, wherein said step of verifying said shared resource being released repeatedly checks said release status until said shared resource is released.

15. The method as claimed in claim 9, wherein said multiprocessor platform is a dual-core processor platform.

16. The method as claimed in claim 9, wherein said signal is an interrupt command.

17. The method as claimed in claim 9, wherein said pre-determined period of T cycles of said timer is set by software on said first processor.

* * * * *